US012568011B2

(12) United States Patent (10) Patent No.: US 12,568,011 B2
Bengtsson et al. (45) Date of Patent: Mar. 3, 2026

(54) TONE RESERVATION WITH PAPR REDUCTION SIGNAL ON ONLY REAL OR IMAGINARY PART OF EACH RESERVED TONE

(71) Applicant: Sony Group Corporation, Tokyo (JP)

(72) Inventors: Erik Bengtsson, Eslöv (SE); Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 368 days.

(21) Appl. No.: 18/011,180

(22) PCT Filed: Jun. 29, 2021

(86) PCT No.: PCT/EP2021/067874
§ 371 (c)(1),
(2) Date: Dec. 18, 2022

(87) PCT Pub. No.: WO2022/008300
PCT Pub. Date: Jan. 13, 2022

(65) Prior Publication Data
US 2023/0216721 A1      Jul. 6, 2023

(30) Foreign Application Priority Data
Jul. 9, 2020      (SE) ................................... 2050877-6

(51) Int. Cl.
*H04L 27/26* (2006.01)
*H04L 5/00* (2006.01)
*H04L 27/34* (2006.01)
(52) U.S. Cl.
CPC .......... *H04L 27/2618* (2013.01); *H04L 5/001* (2013.01); *H04L 27/3411* (2013.01)

(58) Field of Classification Search
CPC ............. H04L 27/2623; H04L 27/2614; H04L 27/2647; H04L 27/3411; H04L 5/001
See application file for complete search history.

(56) References Cited

U.S. PATENT DOCUMENTS 10,931,493 B1 * 2/2021 Ferdinand ............. H04L 5/0007
11,190,383 B2 * 11/2021 Eger .................... H04B 7/0456
(Continued)

FOREIGN PATENT DOCUMENTS

CN 101783781 A 7/2010
CN 102316069 A 1/2012
(Continued)

OTHER PUBLICATIONS

Jha et al. Reduction of Peak to Average Power Ratio (PAPR) in Orthogonal Frequency Division Multiplexing (OFDM): A Novel Approach Based on Clipping and Amplification; 2009 Fourth International Conference on Computer Sciences and Convergence Information Technology.*
(Continued)

*Primary Examiner* — Jay P Patel
(74) *Attorney, Agent, or Firm* — Tucker Ellis LLP

(57) ABSTRACT
A transmitter node is disclosed for reducing Peak to Average Power Ratio, PAPR. The transmitter node comprises circuitry configured to cause the transmitter node to transmit, to a receiver node, data in OFDM symbols. For one OFDM symbol, a real part of a first data symbol transmitted on a first subcarrier and an imaginary part of a second data symbol transmitted on a second subcarrier, different from the first subcarrier, are reserved for transmission of a PAPR reducing signal. Resource locations of the first data symbol and of the second data symbol are determined based on preconfigured reservation rules.

20 Claims, 8 Drawing Sheets

(56) References Cited

U.S. PATENT DOCUMENTS

| | | | |
|---|---|---|---|
| 11,496,171 B1 * | 11/2022 | Laufer | H04B 1/123 |
| 2007/0140367 A1 | 6/2007 | Braithwaite | |
| 2007/0183520 A1 | 8/2007 | Kim et al. | |
| 2011/0286537 A1 | 11/2011 | Stewart | |
| 2013/0251056 A1 * | 9/2013 | Nishikawa | H04L 27/26524 |
| | | | 375/260 |
| 2014/0169188 A1 | 6/2014 | Arambepola et al. | |
| 2017/0078127 A1 | 3/2017 | Madaiah et al. | |
| 2018/0145859 A1 * | 5/2018 | Xu | H04L 27/2618 |
| 2018/0287505 A1 * | 10/2018 | Logan | G01S 13/02 |
| 2021/0021450 A1 * | 1/2021 | Zhang | H04L 27/2636 |
| 2021/0022044 A1 * | 1/2021 | Zhang | H04W 28/20 |
| 2021/0195654 A1 * | 6/2021 | Lei | H04B 17/26 |
| 2021/0281457 A1 * | 9/2021 | Eger | H04W 72/23 |
| 2021/0359890 A1 * | 11/2021 | Sahraei | H04L 27/2614 |
| 2021/0409162 A1 * | 12/2021 | Wolf | H04L 27/2623 |
| 2022/0368365 A1 * | 11/2022 | Laufer | H04L 27/2647 |
| 2023/0064912 A1 * | 3/2023 | Lei | H04L 1/08 |

FOREIGN PATENT DOCUMENTS

| | | | | | |
|---|---|---|---|---|---|
| CN | 104144140 A | 11/2014 | | | |
| CN | 106789828 A | 5/2017 | | | |
| CN | 109818896 A | 5/2019 | | | |
| EP | 3471360 A1 | 4/2019 | | | |
| EP | 3826256 A1 * | 5/2021 | | H04L 27/2626 |
| WO | WO-2018016718 A2 | 1/2018 | | | |
| WO | WO-2021178121 A1 * | 9/2021 | | H04W 72/23 |

OTHER PUBLICATIONS

International Search Report and Written Opinion from corresponding International Application No. PCT/EP2021/067874, mailed on Oct. 7, 2021, 11 pages.

Office Action and Search Report from corresponding Swedish Application No. 2050877-6, mailed on May 5, 2021, 8 pages.

Rahmatallah, Yasir et al., "Peak-to-Average Power Ratio Reduction in OFDM Systems: A Survey and Taxonomy", IEEE Communications Surveys & Tutorials, vol. 15, No. 4, Jan. 2013, pp. 1567-1592.

* cited by examiner

Real part of ▨   Im. part of ▨

Real part of ▨   Im. part of ▨

Freq

Figure 5:
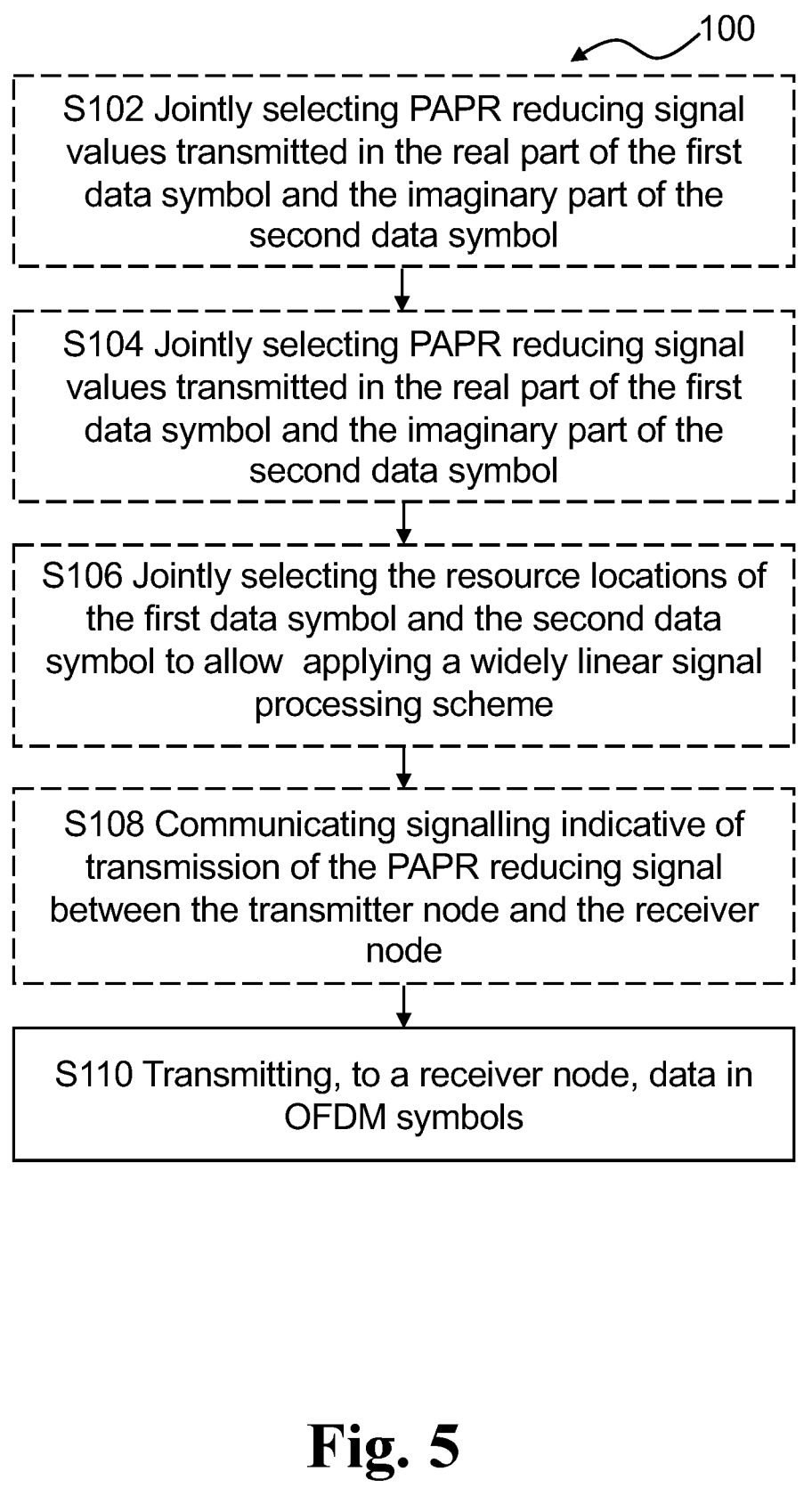

100

S102 Jointly selecting PAPR reducing signal values transmitted in the real part of the first data symbol and the imaginary part of the second data symbol S104 Jointly selecting PAPR reducing signal values transmitted in the real part of the first data symbol and the imaginary part of the second data symbol S106 Jointly selecting the resource locations of the first data symbol and the second data symbol to allow applying a widely linear signal processing scheme S108 Communicating signalling indicative of transmission of the PAPR reducing signal between the transmitter node and the receiver node S110 Transmitting, to a receiver node, data in OFDM symbols

S202 Communicating, between the receiver node and the transmitter node, signalling indicative of the PAPR reducing signal S204 Receiving, from the transmitter node, data in OFDM symbols S206 Decoding the received real part of the first data symbol S208 Decoding the received imaginary part of the second data symbol S210 Discarding

TONE RESERVATION WITH PAPR REDUCTION SIGNAL ON ONLY REAL OR IMAGINARY PART OF EACH RESERVED TONE

The present disclosure pertains to the field of wireless communications. The present disclosure relates to a transmitter node for reducing peak to average power ratio, related receiver node and related methods.

BACKGROUND

Today, Orthogonal Frequency Division Multiplexing, OFDM, is a default choice of modulation whenever there are no constraints that prevents its use. For example, a constraint may be that, in both Long Term Evolution, LTE, and New Radio, NR, the power amplifiers of a wireless device (such as user equipment, UE) are limited in terms of hardware (e.g. with a simple hardware architecture, e.g. low-cost) and can therefore not work satisfactorily for input signals with a high Peak to Average Power Ratio, PAPR. For example, a high PAPR requires an amplifier that can amplify linearly in an extensive dynamical region, which is problematic to build in hardware. For wireless devices with simple hardware architecture, amplifiers have characteristics which are far from ideal and cannot amplify linearly in an extensive dynamical region. Therefore, uplink in LTE and NR is in fact not based on OFDM in its standard form. Instead, single-carrier-frequency-division multiple access, SC-FDMA, is used.

SUMMARY

There is a need for methods that reduce PAPR of OFDM sufficiently, which may lead to adopting OFDM in implementations of uplink e.g. in LTE and/or NR.

Accordingly, there is a need for transmitter nodes, receiver nodes and methods for reducing Peak to Average Power Ratio, PAPR, which mitigate, alleviate or address the existing shortcomings and provide an improved performance with low additional cost or complexity at receiver node and/or the transmitter node. The performance is seen as improved over schemes within a same group of techniques for PAPR reduction.

A transmitter node is disclosed for reducing Peak to Average Power Ratio, PAPR. The transmitter node comprises circuitry configured to cause the transmitter node to transmit, to a receiver node, data in OFDM symbols. For one OFDM symbol, a real part of a first data symbol transmitted on a first subcarrier and an imaginary part of a second data symbol transmitted on a second subcarrier, different from the first subcarrier, are reserved for transmission of a PAPR reducing signal. Resource locations of the first data symbol and of the second data symbol are determined based on preconfigured reservation rules.

A method for reducing peak-to-average-power-ratio, PAPR is disclosed. The method is performed by a transmitter node. The method comprises transmitting, to a receiver node, data in OFDM symbols. For one OFDM symbol, a real part of a first data symbol transmitted on a first subcarrier and an imaginary part of a second data symbol transmitted on a second subcarrier, different from the first subcarrier, are reserved for a PAPR reducing signal. Resource locations of the first data symbol and of the second data symbol are determined based on preconfigured reservation rules.

It is an advantage of the disclosed transmitter node and related method that the performance in terms of PAPR reduction and signal processing is improved while not increasing complexity. Also, the disclosed transmitter node and related method advantageously limit the overhead and the need for control signalling between the transmitter node and the receiver node. This may lead to enabling the use of OFDM also with simple or hardware limited transmitters. In other words, the disclosed technique allows the amplifier to have a simpler hardware architecture while maintaining the same signal quality. For example, with low PAPR signal, the Power Amplifier can be biased closer to the compression point (e.g. lower back-off, as the swing of the signal is less, the Power Amplifier stay in its linear region), this allows the Power Amplifier to operate much more efficiently (i.e. better Power Added efficiency, PAE). Current for the same transmit RF power may be saved.

Disclosed is a receiver node for enabling Peak to Average Power Ratio, PAPR, reduction. The receiver node comprises circuitry configured to cause the receiver node to receive, from a transmitter node, data in OFDM symbols, wherein for one OFDM symbol, a real part of a first data symbol received on a first subcarrier and an imaginary part of a second data symbol received on a second subcarrier, different from the first subcarrier, are reserved for a PAPR reducing signal. Resource locations of the first data symbol and of the second data symbol are determined based on preconfigured reservation rules.

Disclosed is a method performed by a receiver node, for enabling peak-to-average-power-ratio, PAPR, reduction, the method comprising receiving, from a transmitter node, data in OFDM symbols, wherein for one OFDM symbol, a real part of a first data symbol received on a first subcarrier and an imaginary part of a second data symbol received on a second subcarrier, different from the first subcarrier, are reserved for a PAPR reducing signal. Resource locations of the first data symbol and of the second data symbol are determined based on preconfigured reservation rules.

It is an advantage of the disclosed receiver node and related method that the performance in terms of signal processing is improved while not increasing complexity. Also, the disclosed receiver node and related method advantageously limit the overhead and the need for control signalling between the transmitter node and the receiver node. This may lead to enabling the use of OFDM also with simple or hardware limited receivers.

BRIEF DESCRIPTION OF THE DRAWINGS

The above and other features and advantages of the present disclosure will become readily apparent to those skilled in the art by the following detailed description of example embodiments thereof with reference to the attached drawings, in which:

FIG. 5 is a flow-chart illustrating an example method, performed by a transmitter node, for reducing peak-to-average-power-ratio, PAPR according to this disclosure.

DETAILED DESCRIPTION

Figure 1:
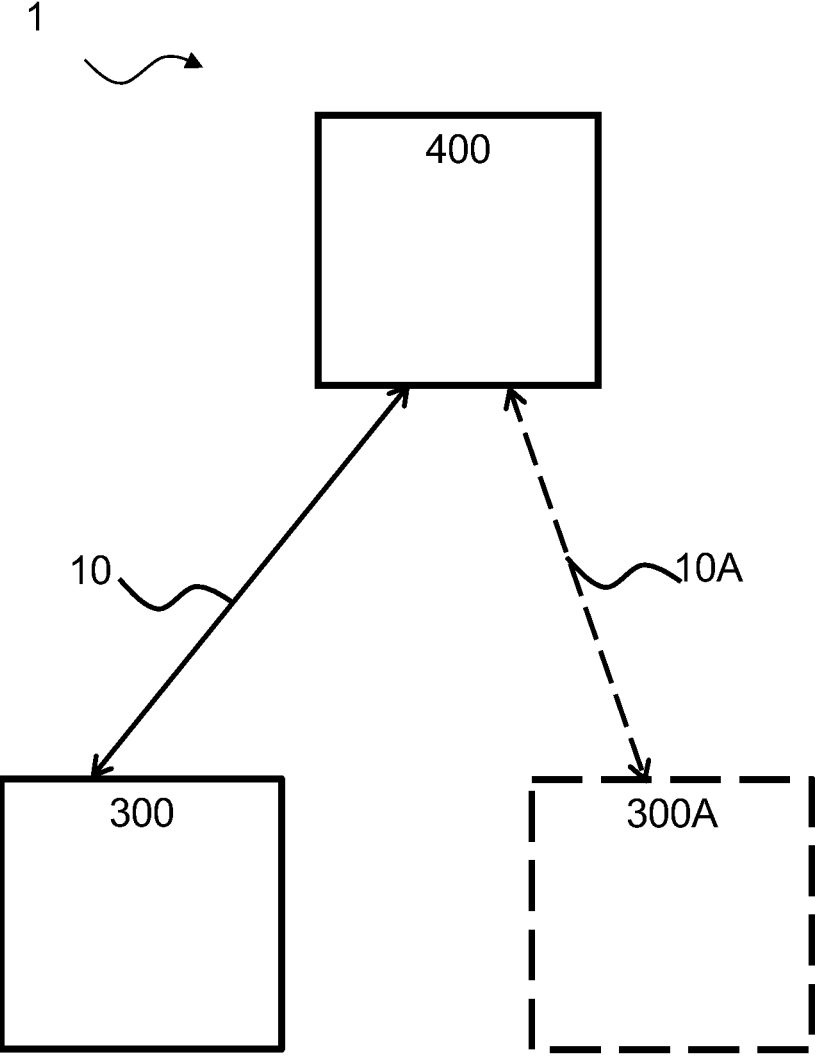
FIG. 1 is a diagram illustrating an example wireless communication system comprising an example transmitter node and an example receiver node according to this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example transmitter node 400 and an example receiver node 300 according to this disclosure.

As discussed in detail herein, the present disclosure relates to a wireless communication system 1 comprising a cellular system, for example, a 3GPP wireless communication system.

In one or more embodiments, a transmitter node 400 comprises a network node, while a receiver node 300 comprises a wireless device, such as a mobile device and/or a user equipment, UE (for example in downlink communication). A network node may be seen as a radio access network, RAN, node operating in the radio access network, such as a base station, an evolved Node B, eNB, gNB. In one or more embodiments, RAN node is a functional unit which may be distributed in several physical units. A wireless device may refer to a mobile device and/or a user equipment, UE.

In one or more embodiments, the receiver node 300 may act as a network node, while a the transmitter node may act as a wireless device (for example in uplink communication).

The wireless communication system 1 described herein may comprise one or more receiver nodes 300, 300A, and/or one or more transmitter nodes 400.

The receiver node 300, 300A may be configured to communicate with the transmitter node 400 via a wireless link (or radio access link) 10, 10A.

Figures 2A, 2B, 2C:
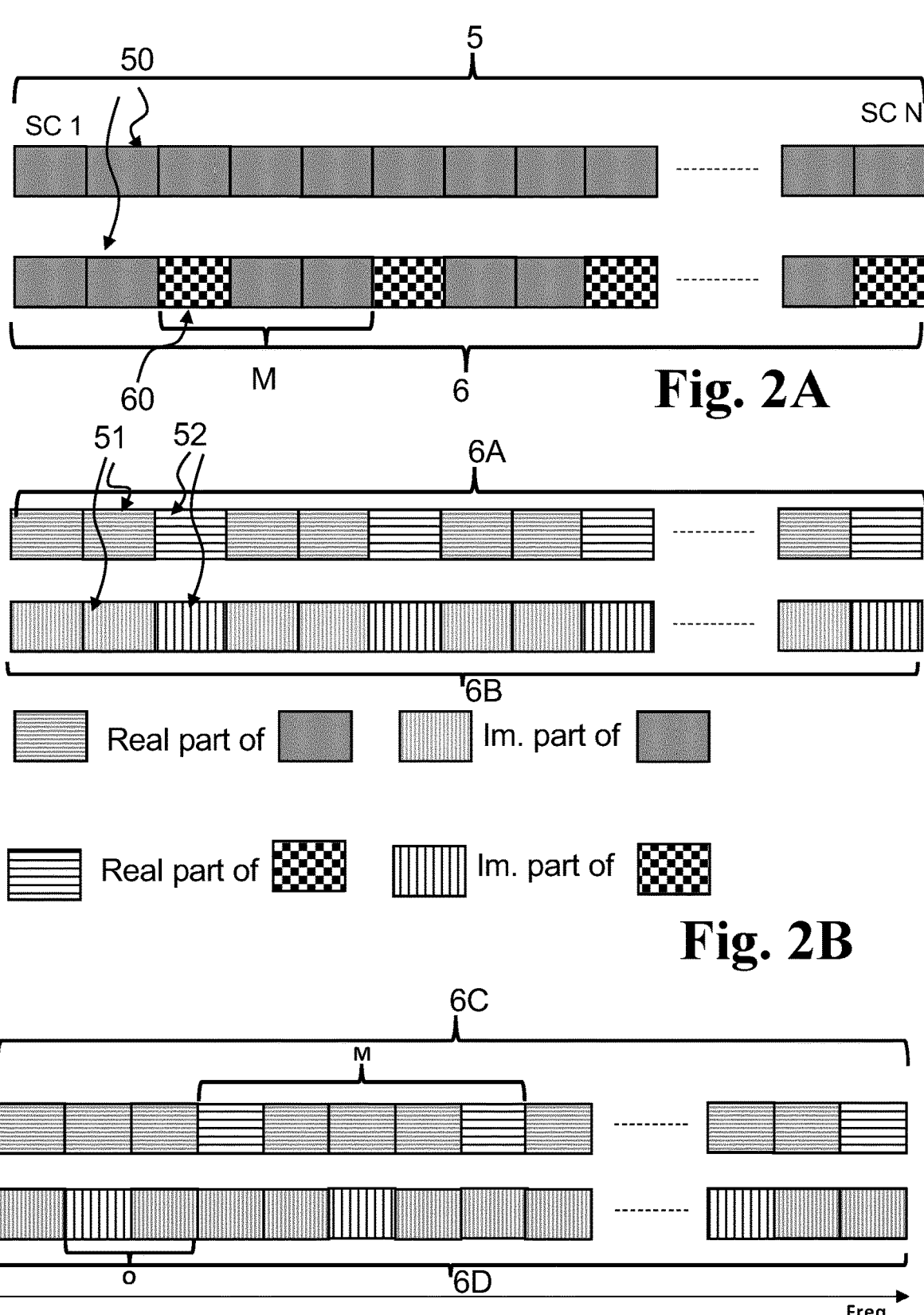
FIG. 2A is a diagram illustrating tone reservation in example OFDM symbols over N subcarriers.
FIG. 2B is a diagram illustrating tone reservation in an example OFDM symbol over N subcarriers where real parts and imaginary parts of data symbols are explicitly shown.
FIG. 2C is a diagram illustrating an example tone reservation in an example OFDM symbol over N subcarriers where real parts and imaginary parts of data symbols are reserved according to one or more embodiments of this disclosure.

FIG. 2A is a diagram illustrating tone reservation in an example OFDM symbol 5 over N subcarriers, and an example OFDM symbol 6 over N subcarriers.

An OFDM symbol comprises a plurality of resource element, wherein each resource element consists of one OFDM sub-carrier. For example, an OFDM symbol includes a plurality of OFDM sub-carriers, wherein each OFDM subcarrier carries a data symbol. An OFDM symbol 5, 6 includes a plurality of data symbols 50, 60. For example, a data symbol may comprise an information-carrying data symbol (e.g. data symbol 50) and/or a PAPR-reducing data symbol (e.g. data symbol 60). For example, OFDM symbol 5 does not comprise PAPR-reducing data symbols.

For example, a conventional PAPR reducing technique is illustrated in "Peak-To-Average Power Ratio Reduction in OFDM Systems: A Survey and Taxonomy", by Y. Rahmatallah, S. Mohan, IEEE Communications Surveys & Tutorials.

PAPR may be seen as a ratio between the maximum power of a sample in a given OFDM transmit symbol divided by the average power of that OFDM symbol. In other words, PAPR is the ratio of peak power to the average power of a signal. PAPR reducing techniques include Tone Reservation, TR.

For example, as a low PAPR signals enables a higher average output power (for example, as the power amplifier can be biased with a smaller back off, and operate more effectively), there may be a trigger to activate the disclosed technique.

An OFDM system may operate using N subcarriers, illustrated as SC1 . . . SC N in FIG. 2A. Without TR, each subcarrier carries a data symbol.

A data symbol may be seen as a complex valued symbol, modulation symbol, such as a IQ sample symbol obtained by modulation, e.g. obtained by Quadrature amplitude modulation, QAM, and/or Quadrature Phase Shift Keying, QPSK.

In a system with TR, a set of subcarriers is reserved, and carries data symbols intended to reduce the PAPR, which may be called "PAPR-reducing data symbols". In the system with TR, a set of subcarriers is reserved, and carries data symbols intended to carry information (e.g. data, exclusive of PAPR reducing data symbols), which may be called "information-carrying data symbols".

In FIG. 2A, TR is illustrated by selecting a subset of reserved subcarriers for PAPR reduction as every Mth in an OFDM symbol 6. In other words, the PAPR reduction can be controlled by M configured by the TR scheme. To select the values to be carried by the reserved subcarriers, (e.g., to select what data symbol is in the subcarrier 60, e.g. a PAPR-reducing data symbol), several methods may be applied.

Let a denote the set of information-carrying data symbols 50 to be carried by the subcarriers in OFDM symbol 6 of FIG. 2A. Further, let b denote the set of PAPR reducing data symbols carried by the subcarriers 60 in OFDM symbol 6 of FIG. 2A. The transmitted continuous complex baseband signal caused by only a is denoted $s_a(t)$, and the signal caused by b is denoted $s_b(t)$. The following optimization problem may be solved to find b given a:

$$\min_{b} |s_b(t)|^2 \text{ such that} \tag{1}$$

$$|s_a(t) + s_b(t)|^2 \le P_{max}, \forall\, t$$

where $P_{max}$ is a given value that allows for a tradeoff between the peak-power ($P_{max}$) and additional transmit energy ($|s_b(t)|^2$). Numerical methods (such as interior-point methods) are used to solve the minimization problem, which may not be a convex problem. In other words, b is selected so that Equation (1) is satisfied. Stated differently, for example, when $P_{max}$ is chosen too small, there exists no b such that (1) has a solution and $P_{max}$ needs to be increased.

FIG. 2B is a diagram illustrating tone reservation in an OFDM symbol with two illustrated parts 6A, 6B over N subcarriers where real parts and imaginary parts of data symbols are explicitly shown. FIG. 2B shows that within each subcarrier, there is one complex-valued number (typically referred to as I and Q). For information-carrying data symbols, like data symbol 51, the real part of data symbol 51 is shown in part 6A and the imaginary part of data symbol 51 is shown in part 6B. The same is applies for the subcarriers reserved for PAPR, e.g. for carrying PAPR-reducing data symbols, such as PAPR-reducing data symbol 52 of OFDM symbols 6A and 6B. FIG. 2B explicitly shows the real parts in OFDM symbol part 6A illustrated with horizontal stripes and the imaginary parts in the OFDM symbol part 6B illustrated with vertical strips.

FIG. 2C is a diagram illustrating an example tone reservation in an example OFDM symbol with parts 6C, 6D over N subcarriers where real parts and imaginary parts of data symbols are reserved according to one or more embodiments of this disclosure. To make use of widely linear WL processing, the OFDM symbol of FIG. 2B is changed so that the real and imaginary parts of the PAPR reducing signals are offset against each other. FIG. 2C shows an example structure of parts 6C, 6D of an OFDM symbol where a real part and an imaginary part of the PAPR reducing signal are not located at the same subcarrier. If they are, there is no benefit of WL.

In FIG. 2C, the density of reserved subcarriers for PAPR is still the same as in FIG. 2B (given by the reciprocal of M), but the real and imaginary parts of the respective data symbols for PAPR reductions have an offset O, as shown in part 6C and 6D of the OFDM symbol. The present disclosure proposes to use a non-zero offset O.

Let us now refer to the real and imaginary data symbols as $a_R$ and $a_I$, respectively, and the real and imaginary part of the PAPR reducing data symbols as $b_R$ and $b_I$, respectively. Then, time-domain signals generated from $a_R$ and $a_I$, $s_{a_R,a_I}(t)$, and from $b_R$ and $b_I$, $s_{b_R,b_I}(t)$, respectively, are obtained. With the time-domain signals generated, the following may be solved:

$$\min_{b_R,b_I}|s_{b_R,b_I}(t)|^2 \text{ such that} \qquad (2)$$

$$|s_{a_R,a_I}(t) + s_{b_R,b_I}(t)|^2 \leq P_{max}, \forall\, t.$$

A widely linear, WL, processing may be automatically incorporated whenever the real and imaginary parts forming the PAPR reducing symbols are not located at the same subcarrier. The PAPR-reducing data symbols disclosed herein are not be treated as a complex value for multiplication of the signal processing, but as a real part and imaginary part, which allows for WL processing.

The disclosed technique permits, in one or more embodiments, a separation of the real and imaginary parts of data symbols communicated using the reserved subcarriers in a TR scheme. This in turn allows for WL processing which ultimately improves performance (at no additional cost or complexity at neither the transmitter node, nor the receiver node). In other words, the disclosed technique may be seen as PAPR reduction via widely linear tone reservation.

Figure 3:
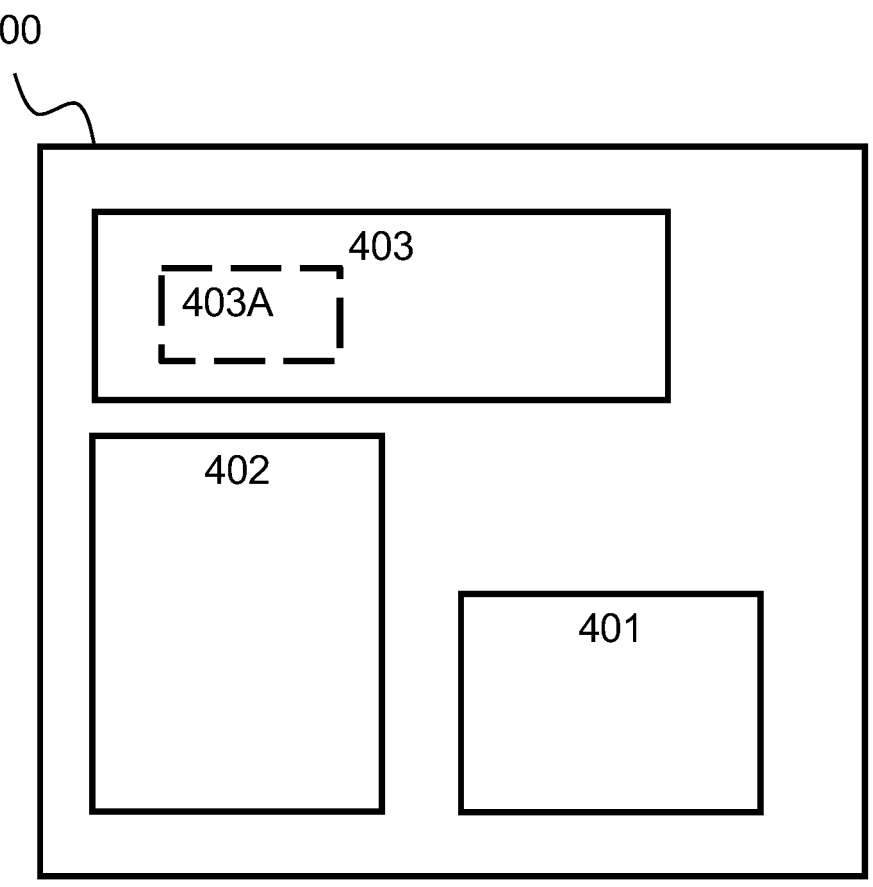
FIG. 3 is a block diagram illustrating an example transmitter node according to this disclosure

FIG. 3 is a block diagram illustrating an example transmitter node 400 according to this disclosure. The transmitter node 400 is a transmitter node for reducing Peak to Average Power Ratio, PAPR.

The transmitter node 400 comprises circuitry configured to cause the transmitter node to transmit, to a receiver node, data in OFDM symbols, wherein for one OFDM symbol, a real part of a first data symbol transmitted on a first subcarrier and an imaginary part of a second data symbol transmitted on a second subcarrier, different from the first subcarrier, are reserved for transmission of a PAPR reducing signal. In other words, the real part of the first data symbol associated with the first subcarrier and the imaginary part of the second data symbol associated with the second subcarrier are only used for a PAPR reducing signal, and do not carry any data, such as information. In other words, the first data symbol transmitted on the first subcarrier carries no information on its imaginary part while the second data symbol transmitted on the second subcarrier carries no information on its real part.

For example, the one OFDM symbol includes the real part of the first data symbol associated with the first subcarrier, the imaginary part of the second data symbol associated with the second subcarrier as a PAPR reducing signal. In other words, the first data symbol may be seen as a PAPR-reducing data symbol, such as a data symbol carrying a PAPR-reducing signal on its real part. In other words, the second data symbol may be seen as a PAPR-reducing data symbol, such as a data symbol carrying a PAPR-reducing signal on its imaginary part. The one OFDM symbol may carry other data symbols, which are "information-carrying" data symbols in the rest of the subcarriers.

Resource locations of the first data symbol and of the second data symbol are determined based on preconfigured reservation rules. Resource locations may be seen as location of the radio resources allocated to PAPR reduction or TR, e.g. in the frequency resource space. In other words, the resource locations (e.g. which subcarriers in the OFDM symbol) are determined to allow for transmission of the real part of the first data symbol on the first subcarrier and the imaginary part of the second data symbol transmitted on the second subcarrier. The second subcarrier is different from the first subcarrier. Stated differently, the preconfigured reservation rules may indicate that a real part and an imaginary part forming the PAPR reducing signal should never be located at the same subcarrier. This allows to benefit from using widely linear signal processing.

The transmitter node 400 comprises memory circuitry 401, processor circuitry 402, and a wireless interface 403. The transmitter node 400 may be configured to perform any of the methods disclosed in FIG. 5. In other words, the processor circuitry 402 and memory circuitry 401 store instructions that when executed by the processor circuitry 402 causes the transmitter node 400 to perform one or more methods illustrated in FIG. 5. The method steps of FIG. 5 may be implemented by hardware e.g. Application-Specific Integrated Circuit, ASIC or similar. The transmitter node 400 is configured to reducing Peak to Average Power Ratio, PAPR.

The wireless interface 403 comprises for example a OFDM communication interface 403A configured to transmit, to a receiver node, data in OFDM symbols, wherein for one OFDM symbol, a real part of a first data symbol transmitted on a first subcarrier and an imaginary part of a second data symbol transmitted on a second subcarrier, different from the first subcarrier, are reserved for transmission of a PAPR reducing signal. In other words, the resource locations of the data symbols are determined based on preconfigured reservation rules and are used for transmitting the real part of a first data symbol transmitted on the first subcarrier and the imaginary part of the second data symbol transmitted on the second subcarrier, so as to reduce PAPR. The OFDM symbol results in a PAPR reducing signal.

In one or more example transmitter nodes, the transmitter node 400 is configured to jointly select PAPR reducing signal values transmitted in the real part of the first data symbol and in the imaginary part of the second data symbol such that an optimization criterion is fulfilled. PAPR reducing signal values may be seen as values of the PAPR reducing signal. The values of the PAPR reducing signal are jointly selected so the optimization criterion is satisfied. In one or more example transmitter nodes, the optimization criterion is based on a cost function related to power. For example, the transmitter node 400 may be configured to determine, and/or select, and/or generate the first data symbol and the second data symbol fulfilling the optimization criterion. The cost function may be seen as signal processing cost function related to power, such as PAPR. For example, the cost function is related to power, ratio between peak power and average power, PAPR. In other words, the cost functions may provide a formulation for an optimization problem, such as for a minimization problem, e.g. to identify a local minima. For example, the power of the signal s_a(t) may have multiple peaks observed and a local peak may be used to reduce the PAPR or a number of moderately high peaks may be reduced.

In one or more example transmitter nodes, the optimization criterion is based on a threshold. The optimization criterion is fulfilled upon a power parameter of the one OFDM symbol being below a threshold. For example, the power parameter comprises a peak power, and/or an average power and/or a statistical representation of the power.

In one or more example transmitter nodes, the transmitter node 400 is configured to jointly select PAPR reducing signal values transmitted in the real part of the first data symbol and the imaginary part of the second data symbol such that the power parameter of the one OFDM symbol is reduced. For example, the power parameter is reduced compared to conventional techniques without the disclosed technique.

In one or more example transmitter nodes, the transmitter node 400 is configured to jointly select the resource locations of the first data symbol and the second data symbol to allow applying a widely linear signal processing scheme. For example, the transmitter node jointly selects the resource locations of the first data symbol and the second data symbol to enable/support a widely linear signal processing scheme. In some embodiments, the transmitter node is configured to apply a widely linear signal processing scheme to the OFDM symbol.

In an illustrative example where the disclosed technique is applied, an arbitrary complex-valued number x=a+bi is considered. The following operation is desired: multiplying x by another complex-valued number y=c+di: y*x=(ac−bd)+(ad+bc)i. However, the multiplication is highly restricted, and, generally, multiplying a complex-valued x with another value should not be done in this way. To understand this, let us view x as a 2×1 vector $$\begin{bmatrix} a \\ b \end{bmatrix}.$$

The multiplication y*x can be carried out by matrix-operations as $$\begin{bmatrix} ac - bd \\ ad + bc \end{bmatrix} = \begin{bmatrix} c & -d \\ d & c \end{bmatrix} \begin{bmatrix} a \\ b \end{bmatrix} \quad (2)$$

The 2×2 matrix (1) representing y has a constrained form. By relaxing this into an arbitrary matrix, widely linear processing may be applied. Thus, to perform a multiplication using a complex number x=a+bi, the following may be calculated e.g.:

$$\begin{bmatrix} y_{11} & y_{12} \\ y_{21} & y_{22} \end{bmatrix} \begin{bmatrix} a \\ b \end{bmatrix} \quad (3)$$

where $y_{ij}$ can be chosen at will, which permits widely linear processing to be used.

In one or more example transmitter nodes, the transmitter node 400 is configured to communicate signalling indicative of transmission of the PAPR reducing signal between the transmitter node and the receiver node. In one or more example transmitter nodes, the signalling indicative of transmission of the PAPR reducing signal comprises control signalling and/or capability signalling. Capability signalling may be seen as the signalling indicative of a capability of the transmitter node and/or of the receiver node to support the disclosed technique. For example, the transmitter node is configured to transmit signalling indicative of transmission of the PAPR reducing signal to the receiver node. For example, the transmitter node 400 is configured to receive signalling indicative of transmission of the PAPR reducing signal from the receiver node.

In one or more example transmitter nodes, the signalling indicative of transmission of the PAPR reducing signal comprises information indicative of the reservation rules. The reservation rules can for example be indicated using a codebook that contains a multitude of configurations for PAPR reservation.

It may be appreciated that the receiver node is aware of the current configuration via communication from the transmitter node, or vice versa. In NR, the gNB may be configured to specify the configuration to the UE. The configuration can be specified either by providing implicit or explicit signalling. As long as the transmitter node informs the receiver node or the other way around, the PAPR reduction may be achieved. For example, a UE can inform gNB of the PAPR reducing signal disclosed herein while the reservation parameters can be decided by UE or gNB.

In one or more example transmitter nodes, the information indicative of the reservation rules comprises a flag indicating the presence of the first data symbol and the second data symbol for the PAPR reducing signal. For example, the flag may be seen as an implicit signalling of the PAPR reservation (such as an implicit indication of presence of the first data symbol and the second data symbol), which is indicative of e.g. capability, and/or an activated state. For example, the flag may be indicative of a certain entry in a codebook that contains a multitude of configurations.

In one or more example transmitter nodes, the information indicative of the reservation rules comprises one or more reservation parameters. For example, the reservation parameters comprise a density parameter and/or an offset parameter and/or a reference subcarrier parameter. The density parameter may indicate a density of PAPR reducing data symbol in an part of the OFDM symbol. The offset parameter may indicate the offset between a first data symbol carrying information only in its real part (e.g. carrying a PAPR-reducing signal in its real part) and a second data symbol carrying information only in its imaginary part (e.g. carrying a PAPR-reducing signal in its imaginary part). The offset parameter may be an integer between 1 and M. For example, in FIG. 2 C, the density parameter is illustrated as M, and the offset parameter is illustrated as O. The reference subcarrier parameter can act as a "starting point" of the application density parameter and/or an offset parameter to determine the resource locations disclosed herein. For example, when O=null, or not signalled, the receiver node assumes the conventional tone reservation system. The reservation parameters may indicate a configuration with an equidistant distribution of the resource locations and the offset. In some embodiments, reservation parameters may indicate one or more specific resource locations. It may be envisaged that reservation parameters may comprise power setting parameters indicating to only use the resource locations disclosed herein when a higher (e.g. the highest) power level is observed.

The transmitter node 400 is optionally configured to perform any of the operations disclosed in FIG. 5 (such as any one or more of S102, S104, S106, S108). The operations of the transmitter node 400 may be embodied in the form of executable logic routines (for example, lines of code, software programs, etc.) that are stored on a non-transitory computer readable medium (for example, memory circuitry 401) and are executed by processor circuitry 402).

Furthermore, the operations of the transmitter node 400 may be considered a method that the network node 400 is configured to carry out. Also, while the described functions and operations may be implemented in software, such functionality may as well be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 3). Memory circuitry 401 is considered a non-transitory computer readable medium.

Memory circuitry 401 may be configured to store preconfigured reservation rules in a part of the memory.

Figure 4:
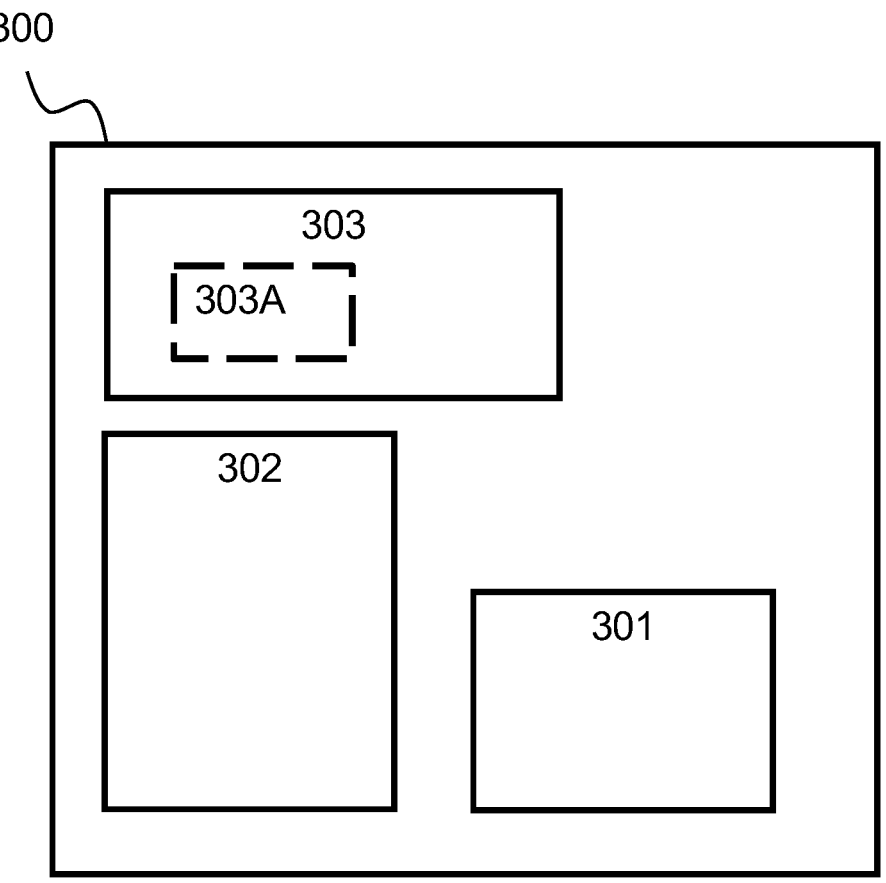
FIG. 4 is a block diagram illustrating an example receiver node according to this disclosure.

FIG. 4 is a block diagram illustrating an example receiver node 300 according to this disclosure. The receiver node 300 is a receiver node for enabling Peak to Average Power Ratio, PAPR.

The receiver node 300 comprises circuitry configured to cause the receiver node 300 to receive, from a transmitter node, data in OFDM symbols, wherein for one OFDM symbol, a real part of a first data symbol received on a first subcarrier and an imaginary part of a second data symbol received on a second subcarrier, different from the first subcarrier, are reserved for a PAPR reducing signal. Resource locations of the first data symbol and of the second data symbol are determined based on preconfigured reservation rules. In other words, the resource locations allocated to the first data symbol (having the real part) and allocated to the second data symbol (having the imaginary part) are determined based on preconfigured reservation rules, so as not to overlap.

The receiver node 300 comprises memory circuitry 301, processor circuitry 302, and a wireless interface 303. The receiver node 300 may be configured to perform any of the methods disclosed in FIG. 6. In other words, the receiver node 300 may be configured for enabling Peak to Average Power Ratio, PAPR.

The wireless interface 303 comprises an OFDM receiver circuitry 303A configured to receive, from a transmitter node, data in OFDM symbols, wherein for one OFDM symbol, a real part of a first data symbol received on a first subcarrier and an imaginary part of a second data symbol received on a second subcarrier, different from the first subcarrier, are reserved for a PAPR reducing signal.

In one or more example receiver nodes, the receiver node 300 is configured to communicate signalling indicative of the PAPR reducing signal between the receiver node and the transmitter node. In one or more example embodiments, the signalling indicative of the PAPR reducing signal comprises control signalling and/or capability signalling. Capability signalling may be seen as the signalling indicative of a capability of the transmitter node and/or of the receiver node to support the disclosed technique. For example, the receiver node is configured to transmit signalling indicative of transmission of the PAPR reducing signal to the transmitter node. For example, the receiver node 300 is configured to receive signalling indicative of the PAPR reducing signal from the transmitter node. The signalling indicative of the PAPR reducing signal can in some example indicate the resource locations of the first data symbol and/or of the second data symbol.

In one or more example receiver nodes, the signalling indicative of the PAPR reducing signal comprises information indicative of reservation rules.

In one or more example receiver nodes, the information indicative of reservation rules comprises a flag indicating the presence of the first data symbol and the second data symbol for PAPR reducing signal. In one or more example receiver nodes, the information indicative of reservation rules comprises one or more reservation parameters. The reservation rules can for example be indicated using a codebook that contains a multitude of configurations for PAPR reservation. In one or more example receiver nodes, the information indicative of the reservation rules comprises a flag indicating the presence of the first data symbol and the second data symbol for the PAPR reducing signal. For example, the flag may be seen as an implicit signalling of the PAPR reservation (such as an implicit indication of presence of the first data symbol and the second data symbol), which is indicative of e.g. capability, and/or an activated state. For example, the flag may be indicative of a certain entry in a codebook that contains a multitude of configurations.

In one or more example receiver nodes, the information indicative of the reservation rules comprises one or more reservation parameters. For example, the reservation parameters comprise a density parameter and/or an offset parameter and/or a reference subcarrier parameter. The density parameter may indicate a density of PAPR reducing data symbol in an part of the OFDM symbol. The offset parameter may indicate the offset between a first data symbol carrying a PAPR-reducing signal only in its real part and a second data symbol carrying a PAPR-reducing signal only in its imaginary part. The offset parameter may be an integer between 1 and M. For example, in FIG. 2 C, the density parameter is illustrated as M, and the offset parameter is illustrated as O. The reference subcarrier parameter can act as a "starting point" of the application density parameter and/or an offset parameter to determine the resource locations disclosed herein. For example, when O=null, or not signalled, the receiver node assumes the conventional tone reservation system. The reservation parameters may indicate a configuration with an equidistant distribution of the resource locations and the offset. In some embodiments, reservation parameters may indicate one or more specific resource locations. It may be envisaged that reservation parameters may comprise power setting parameters indicating to only use the resource locations disclosed herein when a higher (e.g. the highest) power level is observed.

In one or more example receiver nodes, the receiver node 300 is configured to decode the received real part of the first data symbol. In one or more example receiver nodes, the receiver node 300 is configured to decode the received imaginary part of the second data symbol. In one or more example receiver nodes, the receiver node 300 is configured to discard a real part of the second data symbol and an imaginary part of the first data symbol.

Figure 6:
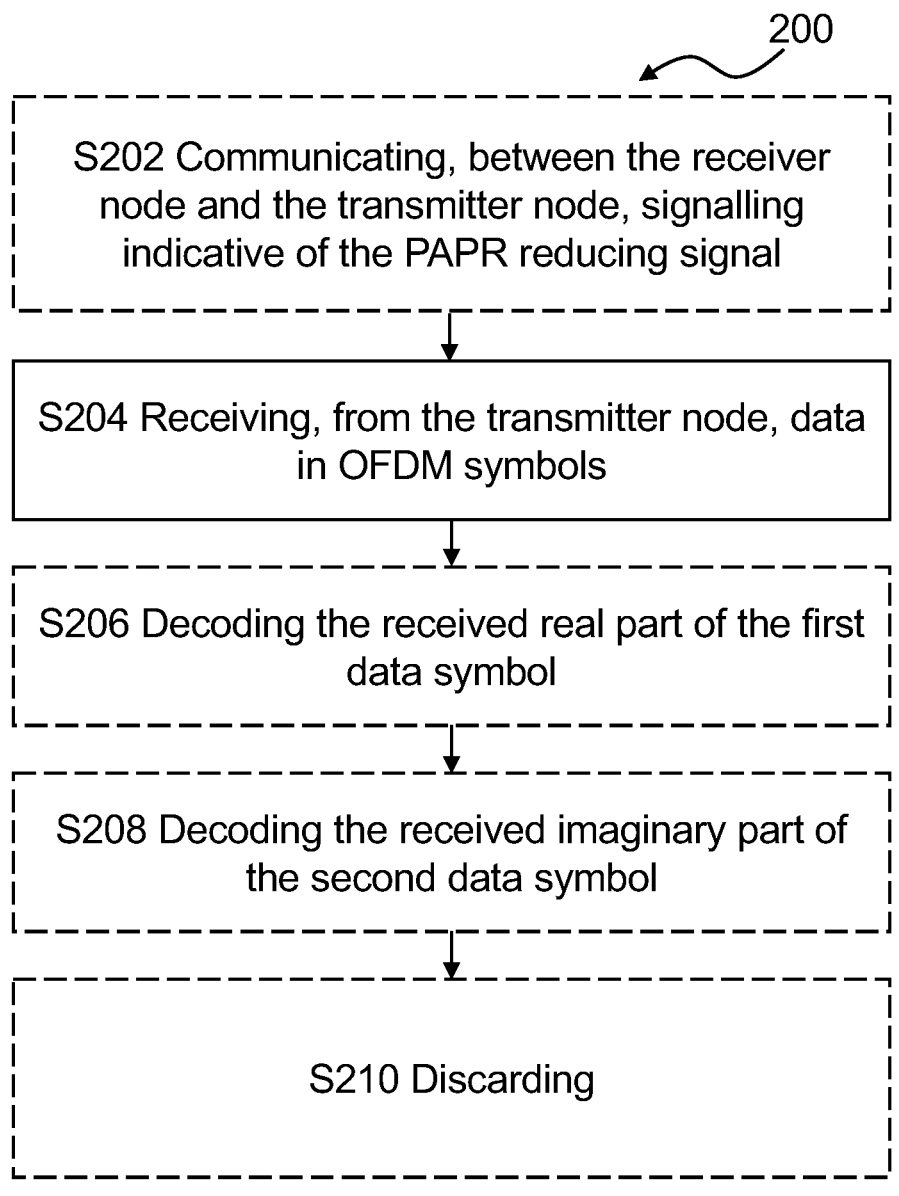
FIG. 6 is a flow-chart illustrating an example method, performed by a receiver node, for enabling peak-to-average-power-ratio, PAPR, reduction according to this disclosure.

The receiver node 300 is optionally configured to perform any of the operations disclosed in FIG. 6 (such as any one or more of S202, S206, S208, S210). The operations of the receiver node 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the receiver node 300 may be considered a method that the receiver node 300 is configured to carry out. Also, while the described functions and operations may be implemented in software, such functionality may as well be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 4). Memory circuitry 301 is considered a non-transitory computer readable medium.

Memory circuitry 301 may be configured to store preconfigured reservation rules in a part of the memory.

FIG. 5 is a flow-chart illustrating an example method 100, performed by a transmitter node, for reducing peak-to-average-power-ratio, PAPR according to this disclosure. The method 100 may be performed by the transmitter node disclosed herein, such as transmitter node 400 of FIGS. 1 and 3.

The method 100 comprises transmitting S110, to a receiver node, data in OFDM symbols, wherein for one OFDM symbol, a real part of a first data symbol transmitted on a first subcarrier and an imaginary part of a second data symbol transmitted on a second subcarrier, different from the first subcarrier, are reserved for a PAPR reducing signal. Resource locations of the first data symbol and of the second data symbol are determined based on preconfigured reservation rules.

In one or more example methods, the method 100 comprises jointly selecting S102 PAPR reducing signal values transmitted in the real part of the first data symbol and in the imaginary part of the second data symbol such that an optimization criterion is fulfilled.

In one or more example methods, the optimization criterion is based on a cost function related to power.

In one or more example methods, the optimization criterion is based on a threshold. The optimization criterion is fulfilled upon a power parameter of the one OFDM symbol being below a threshold.

In one or more example methods, the method 100 comprises jointly selecting S104 PAPR reducing signal values transmitted in the real part of the first data symbol and the imaginary part of the second data symbol such that a power parameter of the one OFDM symbol is reduced.

In one or more example methods, the method 100 comprises jointly selecting S106 the resource locations of the first data symbol and the second data symbol to allow applying a widely linear signal processing scheme.

In one or more example methods, the method comprises communicating S108 signalling indicative of transmission of the PAPR reducing signal between the transmitter node and the receiver node. For example, communicating S108 the signalling comprises transmitting the signalling to the receiver node. For example, communicating S108 the signalling comprises receiving the signalling from the receiver node.

In one or more example methods, the signalling indicative of transmission of the PAPR reducing signal comprises control signalling and/or capability signalling.

In one or more example methods, the signalling indicative of transmission of the PAPR reducing signal comprises information indicative of the reservation rules.

In one or more example methods, the information indicative of the reservation rules comprises a flag indicating the presence of the first data symbol and the second data symbol for the PAPR reducing signal.

In one or more example methods, the information indicative of reservation rules comprises one or more reservation parameters.

FIG. 6 is a flow-chart illustrating an example method 200, performed by a receiver node, for enabling peak-to-average-power-ratio, PAPR, reduction according to this disclosure. The method 200 may be performed by the receiver node disclosed herein, such as receiver node 300 of FIGS. 1 and 4.

The method 200 comprises receiving S204, from the transmitter node, data in OFDM symbols, wherein for one OFDM symbol, a real part of a first data symbol received on a first subcarrier and an imaginary part of a second data symbol received on a second subcarrier, different from the first subcarrier, are reserved for a PAPR reducing signal.

The method 200 comprises resource locations of the first data symbol and of the second data symbol are determined based on preconfigured reservation rules.

In one or more example methods, the method 200 comprises communicating S202, between the receiver node and the transmitter node, signalling indicative of the PAPR reducing signal.

In one or more example methods, the signalling indicative of the PAPR reducing signal comprises information indicative of reservation rules.

In one or more example methods, the information indicative of reservation rules comprises a flag indicating the presence of the first data symbol and the second data symbol for PAPR reducing signal.

In one or more example methods, the information indicative of reservation rules comprises one or more reservation parameters.

In one or more example methods, the method comprises decoding S206 the received real part of the first data symbol.

In one or more example methods, the method comprises decoding S208 the received imaginary part of the second data symbol.

In one or more example methods, the method comprises discarding S210 a real part of the second data symbol and an imaginary part of the first data symbol.

Figure 7:
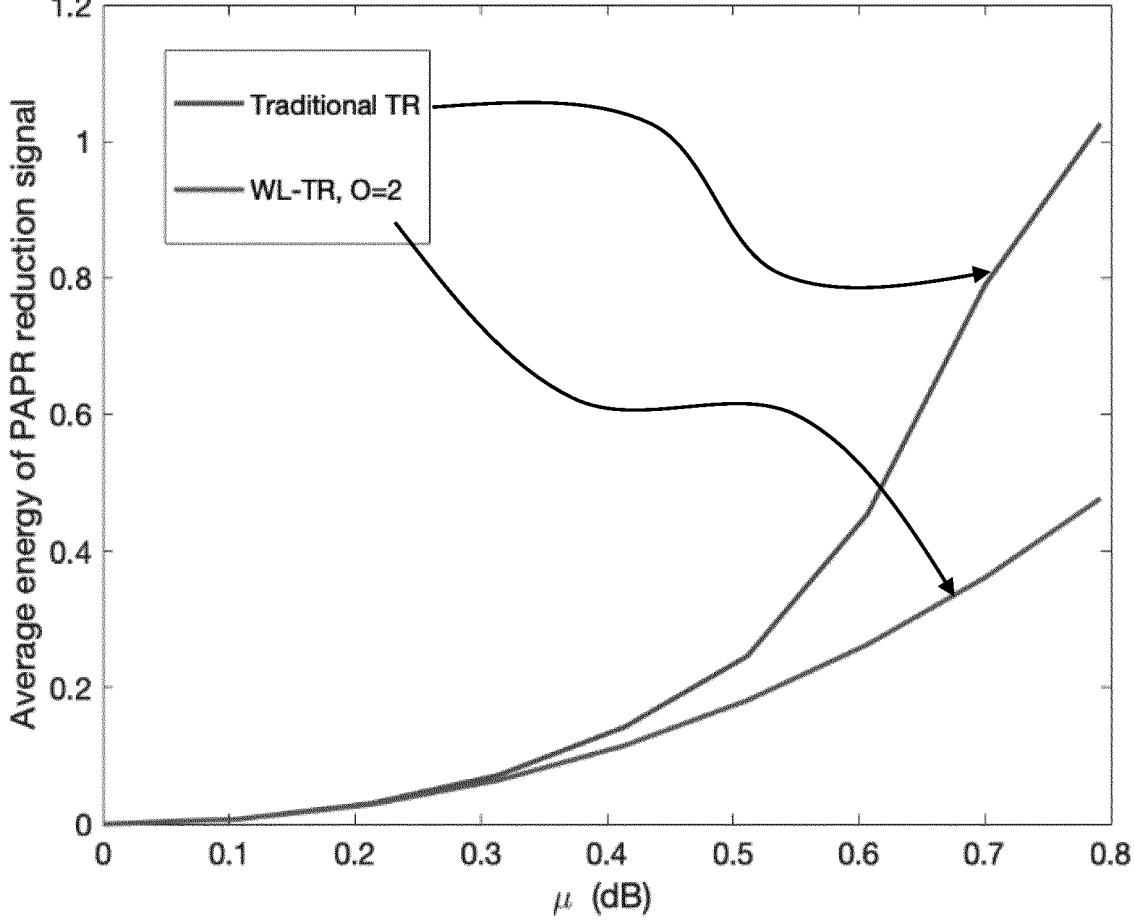
FIG. 7 is a diagram illustrating example performance results according to some embodiments of the disclosure.

FIG. 7 is a diagram illustrating example performance results according to some embodiments of the disclosure. As an example, we consider a case with N=128 (number of subcarriers) and M=5, resulting in 11 PAPR reducing complex-valued symbols for traditional TR, and 22 real-valued PAPR reducing symbols. The results of FIG. 7 are averaged over 1000 randomly generated sets of QPSK information-carrying data symbols. For each random data sequence, the instantaneous peak of $|s_a(t)|^2$, Pinst, is measured and the optimization with Pmax=Pinst/μ is constrained. μ represents the peak reduction. FIG. 7 show the results of average PAPR reduction signal energy required to reach Pmax.

Figure 8:
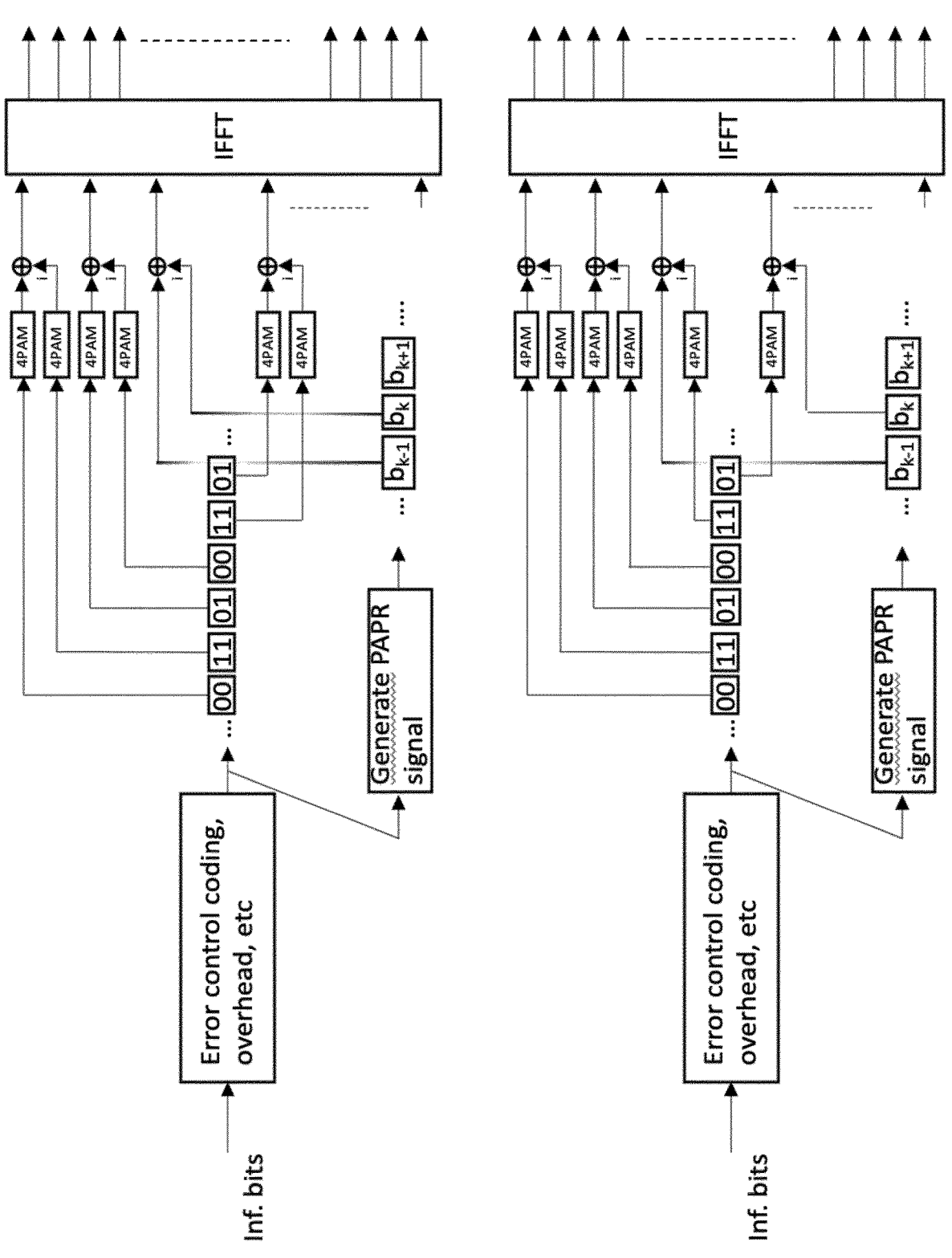
FIG. 8 is a diagram illustrating example transmitter node implementation and an example receiver node implementation according to some embodiments of the disclosure.

FIG. 8 is a diagram illustrating example transmitter node implementation and an example receiver node implementation according to some embodiments of the disclosure. The disclosed technique can be seamlessly integrated into any OFDM-based system, and to systems already using TR. FIG. 8 illustrates how the implementation modifications may be. The upper part of FIG. 8 shows an implementation of standard TR with M=3 (the same case as the bottom part of FIG. 2A) for 16QAM. The bottom part of FIG. 8 shows the disclosed system, for M=3 and 16QAM, and with O=1.

The PAPR-reducing data symbols may form a sequence of independent data symbols for which the imaginary part is taken for the second data symbol and the real part for the first data symbol.

The disclosed technique does not need any hardware changes since modules prior to the IFFT block are implemented in software.

At the receiver node, the operations are reciprocal to those in FIG. 8, and, again, no complexity arise from the disclosed technique as all parts can be implemented using software changes.

Embodiments of methods and products (network node and wireless device) according to the disclosure are set out in the following items:

1. A transmitter node for reducing Peak to Average Power Ratio, PAPR, the transmitter node comprising circuitry configured to cause the transmitter node to:
   transmit, to a receiver node, data in OFDM symbols, wherein for one OFDM symbol, a real part of a first data symbol transmitted on a first subcarrier and an imaginary part of a second data symbol transmitted on a second subcarrier, different from the first subcarrier, are reserved for transmission of a PAPR reducing signal, and
   wherein resource locations of the first data symbol and of the second data symbol are determined based on preconfigured reservation rules.

2. The transmitter node according to item 1, wherein the transmitter node is configured to jointly select PAPR reducing signal values transmitted in the real part of the first data symbol and in the imaginary part of the second data symbol such that an optimization criterion is fulfilled.

3. The transmitter node according to item 2, wherein the optimization criterion is based on a cost function related to power.

4. The transmitter node according to any of items 2-3, wherein optimization criterion is based on a threshold, wherein the optimization criterion is fulfilled upon a power parameter of the one OFDM symbol being below a threshold.

5. The transmitter node according to any of the previous items, wherein the transmitter node is configured to jointly select PAPR reducing signal values transmitted in the real part of the first data symbol and the imaginary part of the second data symbol such that a power parameter of the one OFDM symbol is reduced.

6. The transmitter node according to any of the previous items, wherein the transmitter node is configured to jointly select the resource locations of the first data symbol and the second data symbol to allow applying a widely linear signal processing scheme.

7. The transmitter node according to any of the previous items, wherein the transmitter node is configured to communicate signalling indicative of transmission of the PAPR reducing signal between the transmitter node and the receiver node.

8. The transmitter node according to item 7, wherein the signalling indicative of transmission of the PAPR reducing signal comprises control signalling and/or capability signalling.

9. The transmitter node according to item 7 or 8, wherein the signalling indicative of transmission of the PAPR reducing signal comprises information indicative of the reservation rules.

10. The transmitter node according to item 9, wherein the information indicative of the reservation rules comprises a flag indicating the presence of the first data symbol and the second data symbol for the PAPR reducing signal.

11. The transmitter node according to any of items 9-10, wherein the information indicative of the reservation rules comprises one or more reservation parameters.

12. A receiver node for enabling Peak to Average Power Ratio, PAPR, reduction, the receiver node circuitry configured to cause the receiver node to:
   receive, from a transmitter node, data in OFDM symbols, wherein for one OFDM symbol, a real part of a first data symbol received on a first subcarrier and an imaginary part of a second data symbol received on a second subcarrier, different from the first subcarrier, are reserved for a PAPR reducing signal,
   wherein resource locations of the first data symbol and of the second data symbol are determined based on preconfigured reservation rules.

13. The receiver node according to item 12, wherein the receiver node is configured to communicate, between the receiver node and the transmitter node, signalling indicative of the PAPR reducing signal.

14. The receiver node according to item 13, wherein the signalling indicative of the PAPR reducing signal comprises information indicative of reservation rules.

15. The receiver node according to item 14, wherein the information indicative of reservation rules comprises a flag indicating the presence of the first data symbol and the second data symbol for PAPR reducing signal.

16. The receiver node according to any of items 14-15, wherein the information indicative of reservation rules comprises one or more reservation parameters.

17. The receiver node according to any of items 12-16, wherein the receiver node is configured to:
  decode the received real part of the first data symbol and
  decode the received imaginary part of the second data symbol;
  and discard a real part of the second data symbol and an imaginary part of the first data symbol.

18. A method, performed by a transmitter node, for reducing peak-to-average-power-ratio, PAPR, the method comprising:
  transmitting (S110), to a receiver node, data in OFDM symbols, wherein for one OFDM symbol, a real part of a first data symbol transmitted on a first subcarrier and an imaginary part of a second data symbol transmitted on a second subcarrier, different from the first subcarrier, are reserved for a PAPR reducing signal, and
  wherein resource locations of the first data symbol and of the second data symbol are determined based on preconfigured reservation rules.

19. The method according to item 18, wherein the method comprises:
  jointly selecting (S102) PAPR reducing signal values transmitted in the real part of the first data symbol and in the imaginary part of the second data symbol such that an optimization criterion is fulfilled.

20. The method according to item 19, wherein the optimization criterion is based on a cost function related to power.

21. The method according to any of items 19-21, wherein the optimization criterion is based on a threshold, wherein the optimization criterion is fulfilled upon a power parameter of the one OFDM symbol being below a threshold.

22. The method according to any of the previous items 18-21, wherein the method comprises:
  jointly selecting (S104) PAPR reducing signal values transmitted in the real part of the first data symbol and the imaginary part of the second data symbol such that a power parameter of the one OFDM symbol is reduced.

23. The method according to any of the previous items 18-22, wherein the method comprises:
  jointly selecting (S106) the resource locations of the first data symbol and the second data symbol to allow applying a widely linear signal processing scheme.

24. The method according to any of the previous items 18-23, wherein the method comprises communicating (S108) signalling indicative of transmission of the PAPR reducing signal between the transmitter node and the receiver node.

25. The method according to item 24, wherein the signalling indicative of transmission of the PAPR reducing signal comprises control signalling and/or capability signalling.

26. The method according to any of the items 24-25, wherein the signalling indicative of transmission of the PAPR reducing signal comprises information indicative of the reservation rules.

27. The method according to item 26, wherein the information indicative of the reservation rules comprises a flag indicating the presence of the first data symbol and the second data symbol for the PAPR reducing signal.

28. The method according to any of items 26-27, wherein the information indicative of reservation rules comprises one or more reservation parameters.

29. A method, performed by a receiver node, for enabling peak-to-average-power-ratio, PAPR, reduction, the method comprising:
  receiving (S204), from a transmitter node, data in OFDM symbols, wherein for one OFDM symbol, a real part of a first data symbol received on a first subcarrier and an imaginary part of a second data symbol received on a second subcarrier, different from the first subcarrier, are reserved for a PAPR reducing signal, and
  wherein resource locations of the first data symbol and of the second data symbol are determined based on preconfigured reservation rules.

30. The method according to item 29, wherein the method comprises communicating (S202), between the receiver node and the transmitter node, signalling indicative of the PAPR reducing signal.

31. The method according to item 30, wherein the signalling indicative of the PAPR reducing signal comprises information indicative of reservation rules.

32. The method according to item 31, wherein the information indicative of reservation rules comprises a flag indicating the presence of the first data symbol and the second data symbol for PAPR reducing signal.

33. The method according to any of items 31-32, wherein the information indicative of reservation rules comprises one or more reservation parameters.

34. The method according to any of items 29-33, wherein the method comprises:
  decoding (S206) the received real part of the first data symbol and
  decoding (S208) the received imaginary part of the second data symbol;
  and discarding (S210) a real part of the second data symbol and an imaginary part of the first data symbol.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-8 comprises some circuitries or operations which are illustrated with a solid line and some circuitries or operations which are illustrated with a dashed line. Circuitries or operations which are comprised in a solid line are circuitries or operations which are comprised in the broadest example embodiment. Circuitries or operations which are comprised in a dashed line are example embodiments which may be comprised in, or a part of, or are further circuitries or operations which may be taken in addition to circuitries or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A transmitter node for reducing Peak to Average Power Ratio (PAPR) the transmitter node comprising circuitry configured to cause the transmitter node to:

transmit, to a receiver node, data in OFDM symbols, wherein for one OFDM symbol including a plurality of data symbols over a plurality of subcarriers, a real part of a first data symbol transmitted on a first subcarrier and an imaginary part of a second data symbol transmitted on a second subcarrier, different from the first subcarrier, are reserved for transmission of a real part and an imaginary part of a PAPR-reducing data symbol, respectively, of a PAPR reducing signal, and wherein resource locations of the first data symbol and of the second data symbol are determined based on pre-configured reservation rules.

2. The transmitter node according to claim 1, wherein the transmitter node is configured to jointly select PAPR reducing signal values transmitted in the real part of the first data symbol and in the imaginary part of the second data symbol such that an optimization criterion is fulfilled.

3. The transmitter node according to claim 2, wherein the optimization criterion is based on a cost function related to power.

4. The transmitter node according to claim 2, wherein optimization criterion is based on a threshold, wherein the optimization criterion is fulfilled upon a power parameter of the one OFDM symbol being below a threshold.

5. The transmitter node according to claim 1, wherein the transmitter node is configured to jointly select PAPR reducing signal values transmitted in the real part of the first data symbol and the imaginary part of the second data symbol such that a power parameter of the one OFDM symbol is reduced.

6. The transmitter node according to claim 1, wherein the transmitter node is configured to jointly select the resource locations of the first data symbol and the second data symbol to allow applying a widely linear signal processing scheme.

7. The transmitter node according to claim 1, wherein the transmitter node is configured to communicate signalling indicative of transmission of the PAPR reducing signal between the transmitter node and the receiver node.

8. The transmitter node according to claim 7, wherein the signalling indicative of transmission of the PAPR reducing signal comprises control signalling and/or capability signalling.

9. The transmitter node according to claim 7, wherein the signaling indicative of transmission of the PAPR reducing signal comprises information indicative of the reservation rules.

10. The transmitter node according to claim 9, wherein the information indicative of the reservation rules comprises a flag indicating the presence of the first data symbol and the second data symbol for the PAPR reducing signal.

11. The transmitter node according to claim 9, wherein the information indicative of the reservation rules comprises one or more reservation parameters.

12. A receiver node for enabling Peak to Average Power Ratio (PAPR) reduction, the receiver node circuitry configured to cause the receiver node to:

receive, from a transmitter node, data in OFDM symbols, wherein for one OFDM symbol including a plurality of data symbols over a plurality of subcarriers, a real part of a first data symbol received on a first subcarrier and an imaginary part of a second data symbol received on a second subcarrier, different from the first subcarrier, are reserved for a real part and an imaginary part of a PAPR-reducing data symbol, respectively, of a PAPR reducing signal, wherein resource locations of the first data symbol and of the second data symbol are determined based on pre-configured reservation rules.

13. The receiver node according to claim 12, wherein the receiver node is configured to communicate, between the receiver node and the transmitter node, signaling indicative of the PAPR reducing signal.

14. The receiver node according to claim 13, wherein the signalling indicative of the PAPR reducing signal comprises information indicative of reservation rules.

15. The receiver node according to claim 14, wherein the information indicative of reservation rules comprises a flag indicating the presence of the first data symbol and the second data symbol for PAPR reducing signal.

16. The receiver node according to claim 14, wherein the information indicative of reservation rules comprises one or more reservation parameters.

17. The receiver node according to claim 12, wherein the receiver node is configured to:

decode the received real part of the first data symbol and decode the received imaginary part of the second data symbol;

and discard a real part of the second data symbol and an imaginary part of the first data symbol.

18. A method, performed by a transmitter node, for reducing peak-to-average-power-ratio (PAPR) the method comprising:

transmitting, to a receiver node, data in OFDM symbols, wherein for one OFDM symbol including a plurality of data symbols over a plurality of subcarriers, a real part of a first data symbol transmitted on a first subcarrier and an imaginary part of a second data symbol transmitted on a second subcarrier, different from the first subcarrier, are reserved for a real part and an imaginary part of a PAPR-reducing data symbol, respectively, of a PAPR reducing signal, and wherein resource locations of the first data symbol and of the second data symbol are determined based on pre-configured reservation rules.

19. The method according to claim 18, wherein the method comprises:

jointly selecting PAPR reducing signal values transmitted in the real part of the first data symbol and in the imaginary part of the second data symbol such that an optimization criterion is fulfilled.

20. The method according to claim 19, wherein the optimization criterion is based on a cost function related to power.

* * * * *